Figure 1:
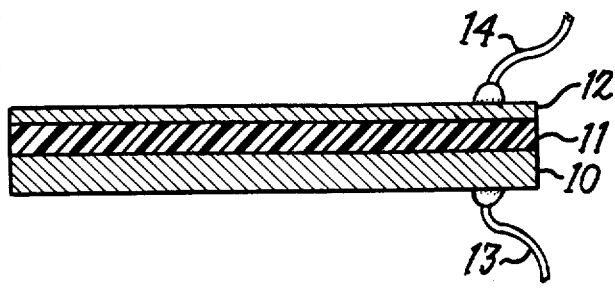

United States Patent [19]

Cichanowski

[11] Patent Number: 4,499,520

[45] Date of Patent: Feb. 12, 1985

[54] CAPACITOR WITH DIELECTRIC COMPRISING POLY-FUNCTIONAL ACRYLATE POLYMER AND METHOD OF MAKING

[75] Inventor: Stanley W. Cichanowski, Bennington, Vt.

[73] Assignee: General Electric Company, Hudson Falls, N.Y.

[21] Appl. No.: 562,873

[22] Filed: Dec. 19, 1983

[51] Int. Cl.³ .................. H01G 1/01; H01G 7/00; H01B 3/00
[52] U.S. Cl. .................. 361/311; 29/25.42; 252/567
[58] Field of Search .............. 361/311, 323; 29/25.42; 252/567

[56] References Cited

U.S. PATENT DOCUMENTS

| 3,068,510 | 12/1962 | Coleman | 18/2 |
| 3,259,816 | 7/1966 | Katchman | 361/323 |
| 3,264,536 | 8/1966 | Robinson et al. | 361/323 |
| 3,743,532 | 7/1973 | Wright et al. | 117/93.31 |
| 3,819,990 | 6/1974 | Hayashi et al. | 29/25.42 X |
| 4,153,925 | 5/1979 | Gazard et al. | 361/323 |
| 4,329,419 | 5/1982 | Goff et al. | 430/283 |
| 4,347,169 | 8/1982 | Sato et al. | 252/567 |
| 4,351,746 | 9/1982 | Parish et al. | 361/311 X |
| 4,376,329 | 3/1983 | Behn et al. | 29/25.42 |

FOREIGN PATENT DOCUMENTS 762953 12/1956 United Kingdom .
1168641 10/1969 United Kingdom .

OTHER PUBLICATIONS

"Thin Film Multilayer Capacitors Using Pyrolytically Deposited Silicon Dioxide," Richard A. Bailey et al., IEEE Trans. on Parts, Hybrids and Packaging, vol. PHP-12, No. 4, Dec., 1976.

Primary Examiner—Donald A. Griffin
Attorney, Agent, or Firm—Arthur E. Bahr; William H. Pittman

[57] ABSTRACT

Novel electrical capacitors comprise two electrodes separated by a dielectric member, said dielectric member comprising a polymer of at least one polyfunctional acrylate. The capacitor structure may constitute a single dielectric coating separating two electrode layers, or may comprise a plurality of alternating electrode layers and dielectric coatings.

20 Claims, 4 Drawing Figures

CAPACITOR WITH DIELECTRIC COMPRISING POLY-FUNCTIONAL ACRYLATE POLYMER AND METHOD OF MAKING

This invention relates to electrical capacitors. More particularly, it relates to novel capacitors having polyfunctional acrylate polymer dielectrics, and a method for making them.

The development of electronic devices and circuits of reduced size has led to a need for significantly smaller capacitors having increased capacity per unit volume and high temperature capabilities. In particular, such capacitors should be characterized by a low dissipation factor over a wide temperature range in order to conserve energy in the capacitor under operation conditions. Since, however, no single capacitor capable of satisfying the variety of service conditions and requirements was known or available, a number of different ones were developed over the years along three main product lines, i.e., the ceramic type, the metallized film type and the electrolytic type. The utility of many of these, however, is limited to somewhat less than the total electronic range up to about 100 microfarads. Moreover, each has other important shortcomings. For example, solid tantalum capacitors of the electrolytic type and ceramic multi-layer capacitors typically have a relatively high dissipation factor and also an undesirable failure mode. On the other hand, the metallized film capacitors have very limited volumetric efficiency and totally lack surface mounting capability. In short, all presently available capacitors are deficient in various respects such as size, long term electronic stability and capability to operate satisfactorily at temperatures in the range of 230°-280° C.

The evolution of the art has accordingly entailed compromises resulting in general recognition of the need for a better answer to the problem. In this well-developed art, that need is one of relatively long standing.

In copending, commonly assigned application Ser. No. 620,647 filed June 14, 1984 and continuation-in-part of Ser. No. 562,873 filed Dec. 19, 1983 now abandoned there is disclosed a novel capacitor structure having particularly advantageous properties which make them adaptable to a wide variety of service conditions and requirements. Said structure comprises successive conductive layers which are offset so as to define a central capacitance region of stacked isolated extending layers, a coating of dielectric deposited on each of said layers so that the layers in the capacitance region are substantially spaced and separated by said coating of dielectric, said coating deposition being controlled so as to slope toward cutoff lines spaced substantially from two separated portions of the central capacitor region, said layer deposition extending beyond said cutoff lines so that successive layers fuse into spaced apart terminal portions, and said cutoff line spacing being sufficient to cause the uppermost dielectric coating of said capacitor to have a horizontal dimension from the capacitor region to the terminal portion to accept a final layer deposition. The disclosure of said application is incorporated by reference herein.

A principal object of the present invention, therefore, is to provide novel capacitors having improved resin dielectrics, and a method for making them.

A further object is to provide such capacitors which are capable of use over a wide range of conditions and in a wide variety of applications.

A still further object is to provide capacitors in which the dielectric has a low dissipation factor and a relatively low degree of capacitance change over a wide temperature range and a wide variety of operating conditions.

Other objects will in part be obvious and will in part appear hereinafter.

In accordance with the foregoing, the present invention includes capacitors comprising two electrodes separated by a dielectric member, said dielectric member comprising a polymer of at least one polyfunctional acrylate having the formula

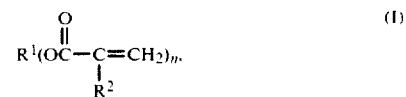

wherein:
- $R^1$ is a hydrocarbon or substituted hydrocarbon radical containing at least 4 carbon atoms;
- $R^2$ is hydrogen or an alkyl radical containing 1-5 carbon atoms; and
- n is from 2 to 6.

The electrodes in the capacitors of this invention may be formed of materials and in configurations known in the art. Typical conductive materials useful as electrodes are aluminum, copper, zinc, tin, stainless steel and alloys thereof, with aluminum being preferred.

The dielectric members are, as previously noted, polymers of polyfunctional acrylates having formula I. In that formula, the $R^1$ value is a hydrocarbon or substituted hydrocarbon radical containing at least 4 carbon atoms. The types of substituents which are permissible will be apparent to those skilled in the art and generally include substituents having only minor effects on the electrical properties of the molecule. Illustrative substituents of this type are hydroxy, alkoxy, carbalkoxy and nitrile substituents. Most often, however, the $R^1$ value is an unsubstituted hydrocarbon radical.

The $R^1$ value contains at least 4 carbon atoms. There is no real upper limit to the number of carbon atoms therein; it is within the scope of the invention to use compounds of formula I in which $R^1$ is a polymeric radical containing, for example, as many as 500 and preferably up to about 300 carbon atoms.

The $R^1$ radical may contain aliphatic, alicyclic or aromatic moieties or a mixture thereof. Preferably, however, all moieties present therein are aliphatic, alicyclic or both.

The $R^2$ value, as previously noted, may be hydrogen or an alkyl radical containing 1-5 carbon atoms. Most often, $R^2$ is hydrogen or methyl and especially hydrogen. Thus, the term "acrylate" as used herein embraces both acrylates and α-substituted acrylates including methacrylates and the like, although the acrylates (i.e. the compounds in which $R^2$ is hydrogen) are usually preferred. The value of n may be from 2 to 6, and is most often 2 or 3.

From the foregoing, it will be apparent that the compounds of formula I may typically be prepared by esterification of acrylic acid, methacrylic acid or the like, or functional derivatives thereof such as the acid chlorides, anhydrides and lower alkyl esters, with a wide variety of compounds containing the R$^1$ value. Illustrative compounds of this type are polyhydroxy compounds and polyepoxides. Particularly useful polyfunctional acrylates of formula I are the following:

Acrylates of aliphatic polyhydroxy compounds containing about 4–20 carbon atoms, illustrated by neopentyl glycol, trimethylolpropane, 1,6-hexanediol and α,ω-diol mixtures having an average chain length of 12–20 carbon atoms.

Acrylates of polymers having groups capable of reacting with acrylic acid or derivatives thereof. Ilustrative are various hydroxy-terminated diene polymers, such as polybutadiene, typically having a number average molecular weight within the range of about 1000–5000.

Acrylates of aromatic diepoxides and polyepoxides, illustrated by diepoxy derivatives of 2,2-bis(4-hydroxyphenyl)propane or "bisphenol A."

A number of commercially available polyfunctional acrylates are useful for the preparation of dielectrics in the capacitors of this invention. Among them are the following, many of which are identified by trademarks as indicated:

Trimethylolpropane triacrylate.
Neopentyl glycol diacrylate.
Bisphenol A diacrylate.
Celanese "Celrad 3700", a diacrylate of a diepoxide derived from bisphenol A.
Sartomer SR-349," a diacrylate of ethoxylated bisphenol A.
Sartomer "Chemlink 2000," a diacrylate of an α,ω-alkanediol containing an average of 14–15 carbon atoms.
A diacrylate of Arco "Poly bd", which is a hydroxy-terminated butadiene resin having a number average molecular weight of about 3000.

While it is within the scope of the invention to use a single polyfunctional compound in forming the dielectric, it is often preferred to employ copolymers prepared from blends of two or more such compounds. This may result in lower dissipation factor than is the case for most polyfunctional acrylates used alone. It may also optimize the physical properties of the material, e.g., lower the viscosity of the monomer composition to facilitate its deposition.

It is also within the scope of the invention to use copolymers prepared from mixtures of at least one compound of formula I with at least one monoacrylate of the formula

(II)

wherein R$^2$ is as previously defined and R$^3$ is a hydrocarbon or substituted hydrocarbon radical, typically containing about 4–25 carbon atoms. Illustrative monoacrylates of formula II are cyclohexyl methacrylate and various acrylated derivatives of fatty acids containing such substituents as carbomethoxy or nitrile. Typical copolymers of compounds of formulas I and II contain about 10–50% by weight, most often about 15–35%, of compounds of formula II with the balance being compounds of formula I.

With respect to these commercially available acrylates and the like, it is frequently preferred to remove residual acrylic acid and other ionic compounds and impurities which may be present in the materials as received from the supplier. Such impurities are readily removed by known methods such as the use of absorption columns or ion exchange resins.

Illustrative polyfunctional acrylate compositions whose polymers are suitable as dielectrics in the capacitors of this invention are illustrated in Tables I and II. All percentages in these tables are by volume.

TABLE I

| Ingredient | Example 1 | 2 | 3 |
|---|---|---|---|
| "Poly bd" diacrylate | 100 | 50 | — |
| "Chemlink 2000" | — | 50 | 100 |

TABLE II

| Ingredient | Example 4 | 5 | 6 | 7 | 8 | 9 | 10 | 11 |
|---|---|---|---|---|---|---|---|---|
| Trimethylolpropane triacrylate | 50 | 100 | — | — | — | — | — | 25 |
| Neopentyl glycol diacrylate | — | — | 50 | 60 | 40 | 40 | 50 | 25 |
| Bisphenol A diacrylate | — | — | — | — | — | 20 | — | — |
| "Sartomer SR-349" | — | — | 50 | 20 | — | — | — | — |
| "Celrad 3700" | 50 | — | — | 20 | 50 | 40 | 50 | 50 |
| Cyclohexyl methacrylate | — | — | — | — | 10 | — | — | — |

A preferred subgenus of the capacitors of this invention is disclosed and claimed in copending, commonly assigned application Ser. No. 562871 file Dec. 19, 1983, the disclosure of which is incorporated by reference herein. The dielectric member in those capacitors is a polymer of at least one polyfunctional acrylate of formula I in which R$^2$ is hydrogen or methyl, n is from 2 to 4, and R$^1$ is an aliphatic, alicyclic or mixed aliphatic-alicyclic radical having about 10–40 carbon atoms which optionally contains up to about three olefinic linkages, said olefinic linkages being non-conjugated.

The R$^1$ radical in this preferred subgenus may be aliphatic, alicyclic or mixed aliphatic-alicyclic; it may optionally contain up to about three olefinic linkages which are non-conjugated, and contains about 10–40 carbon atoms. Suitable polyhydroxy compounds include straight chain compounds such as hexadecanediol and octadecanediol, with the hydroxy groups being located anywhere on the chain, and branched chain isomers thereof. By "branched chain" is meant that at least one carbon atom is present in a branch. Thus, configurations such as

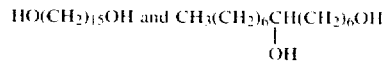

are unbranched, while

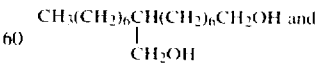

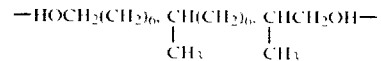

are branched.

A first preferred class of polyhydroxy compounds within this subgenus consists of those characterized by being branched and also by having at least 18 carbon atoms in a single chain; that is, at least 18 carbon atoms are successively bonded without branching. Particularly suitable polyfunctional acrylates derived therefrom are those having the formulas

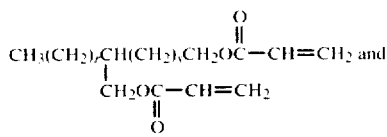

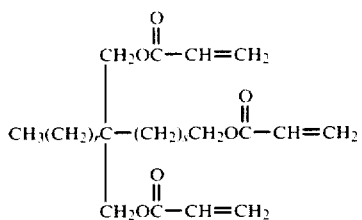

wherein r and s are each 7 or 8 and the sum of r and s is 15. They may be obtained, for example, by acrylic acid esterification of the hydroformylation products of oleic acid, as disclosed in U.S. Pat. No. 4,243,818. Another suitable compound is 1,12-octadecanediol diacrylate, formed by hydrogenolysis of ricinoleic acid followed by esterification.

Also within the first preferred class of polyhydroxy compounds are single compounds and mixtures, usually mixtures, in which $R^1$ is at least one aliphatic or alicyclic radical containing about 20–40 carbon atoms and optionally up to about three non-conjugated olefinic linkages. At least about 40%, and preferably at least about 50%, of the total number of $R^1$ radicals therein are alicyclic. Thus, the polyhydroxy compounds may be entirely alicyclic or may be mixtures of acyclic and alicyclic compounds satisfying these percentage limitations. Acrylates prepared from such polyhydroxy compounds, and their polymers, are disclosed and claimed in copending, commonly assigned application Ser. No. 562894 filed Dec. 19, 1983, the disclosure of which is incorporated by reference herein.

It is frequently convenient to prepare such polyhydroxy compounds by reduction of at least one corresponding polycarboxylic acid or ester thereof, which may be saturated or may contain olefinic linkages. A typical suitable polycarboxylic acid is linoleic acid dimer (hereinafter "dimer acid"), a mixture consisting essentially of acyclic, monocyclic and bicyclic dicarboxylic acids which typically contain up to two olefinic bonds per molecule. A particularly suitable dimer acid is sold by Emery Industries under the trade designation "Empol 1010". According to Kirk-Othmer, *Encyclopedia of Chemical Technology*, Third Edition, Volume 7, pp. 768–770, the following are structures of typical molecular species present in the methyl ester of dimer acid:

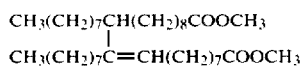

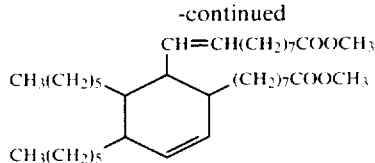

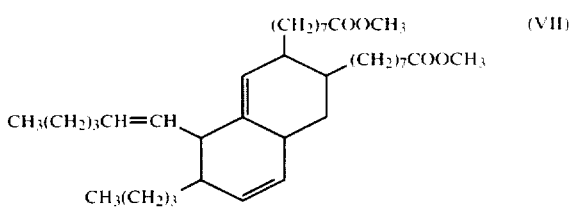

Thus, free dimer acid obviously comprises free dicarboxylic acids having corresponding structures.

The esters of formulas V, VI and VII, their corresponding free acids, and similar polycarboxylic acids and esters may be reduced by known methods, such as by hydrogen in the presence of a hydrogenation catalyst or by lithium aluminum hydride, to produce diols useful for preparation of the polyfunctional acrylates. Depending on the method of reduction of these or similar acids or esters, the reduction product may be saturated or may contain olefinic linkages. For example, lithium aluminum hydride reduction normally will not affect olefinic linkages while some hydrogenation methods (e.g., in the presence of a palladium catalyst) will reduce them to saturated linkages. Thus, reduction of compounds V, VI and VII may produce diols of the respective formulas

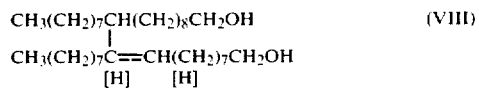

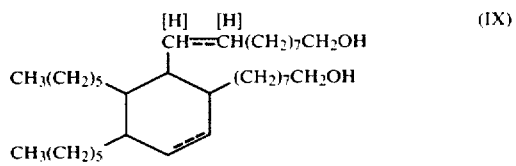

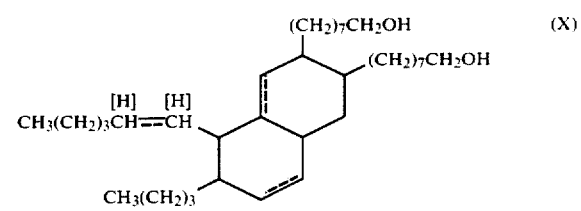

wherein the broken lines and hydrogen atoms in brackets indicate that the corresponding carbon-carbon bonds may be single or double bonds depending on the method of reduction. It is frequently found that the compounds which contain only single bonds have properties somewhat more favorable than those of the analogous double-bonded compounds. Suitable diol mixtures of this type are commercially available from Henkel Corporation under the trade name "Dimerol".

Other suitable polyhydroxy compounds within this first preferred class may be prepared by reduction of various acrylic acid-unsaturated fatty acid condensation products. These polyhydroxy compounds may be illustrated by the formula

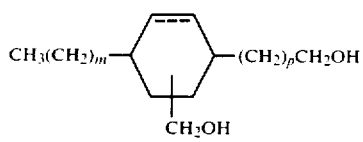

wherein m may be, for example, from 3 to 5, p may be from 7 to 9 and the sum of m and p is 12. A typical commercially available dicarboxylic acid which may be reduced to a diol of formula XI is sold under the trade designation "Westvaco 1550 Diacid"; it has the formula

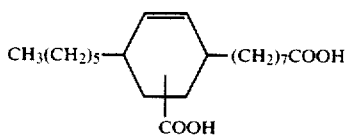

and is an adduct of linoleic acid and acrylic acids. It is also described in Kirk-Othmer, op. cit., at p. 779.

A second preferred class of polyhydroxy compounds consists of 1,2-alkanediols in which $R^1$ has the formula

wherein $R^4$ is an alkyl radical containing about 8-28 carbon atoms. Acrylates of such 1,2-alkanediols, and polymers thereof, are disclosed and claimed in copending, commonly assigned application Ser. No. 563873 filed Dec. 19, 1983, the disclosure of which is also incorporated by reference herein.

Examples of suitable $R^4$ radicals are 1-octyl, 2-methylheptyl, 1-nonyl, 2,3-dimethylheptyl, 1-decyl, 2-dodecyl, 1-tetradecyl, 1-octadecyl, 1-eicosyl and 1-docosyl. Radicals having the formula $R^5CH_2$, wherein $R^5$ is an alkyl and especially a straight chain alkyl radical having about 7-27 and most often about 9-17 carbon atoms, are preferred as $R^4$.

Procedures for acrylic or methacrylic acid esterification of the above-described polyhydroxy compounds will be apparent to one skilled in the art. Thus, the acid and alcohol may typically be reacted in a suitable solvent, in the presence of a small amount of an acidic esterification catalyst such as sulfuric acid, p-toluenesulfonic acid, acidic ion exchange resins or acidified clays. Ordinarily, a stoichiometric excess of the acid is used, the ratio of equivalents of acid to diol typically being between about 2:1 and about 4:1. The reaction is ordinarily carried out at about 100°-200° C., most often about 100°-150° C. It is often preferred to incorporate in the esterification mixture a minor amount of a polymerization inhibitor such as p-methoxyphenol, 2,6-di-t-butylphenol or 2,4,6-tri-b-butylphenol. The acrylic or methacrylic acid may be replaced by a functional derivative thereof such as an acyl halide, lower alkyl ester or amide, with suitable modification of the reaction conditions.

The preparation of the polyfunctional acrylates of the above-described preferred subgenus is illustrated by the following examples.

EXAMPLE 12

A mixture of 102 parts by weight (0.34 mole) of a commercially available (from Henkel Corporation) diol having the formula

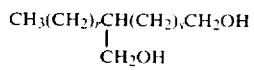

in which the sum of r and s is 15, 2.55 parts of p-methoxyphenol and 2.38 parts of p-toluenesulfonic acid in 153 parts of n-hexane was heated to reflux with stirring and 5.44 parts (0.76 mole) of acrylic acid was added over several hours. Heating was continued as water was removed by azeotropic distillation. When the theoretical amount of water had been removed, the solution was diluted with 206 parts of n-hexane and extracted five times with a 3% (by weight) aqueous potassium hydroxide solution and twice with aqueous sodium chloride solution. Upon evaporation of the hexane, there was obtained 127 parts (92% of theoretical) of the diacrylate which was filtered through glass fibers and stabilized by the addition of 100 ppm of p-methoxyphenol.

EXAMPLE 13

A mixture of 100 grams (0.3 mole) of a commercially available (from Henkel Corporation) triol having the formula

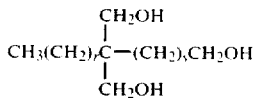

in which the sum of r and s is 15, 0.3 gram of p-methoxyphenol and 2 grams of p-toluenesulfonic acid in 500 ml. of toluene was heated to 120° C. and 115 ml. (1.64 moles) of acrylic acid was added dropwise. Heating was continued as water was removed by azeotropic distillation. When the theoretical amount of water had been removed, the solution was washed with aqueous potassium carbonate solution and dried. The desired triacrylate was obtained as a liquid upon evaporation of solvent.

EXAMPLE 14

Following a procedure similar to that of Example 13, 1,12-octadecanediol diacrylate was prepared.

EXAMPLE 15

To a solution of 96 grams (2.5 moles) of lithium aluminum hydride in 3000 ml. of tetrahydrofuran was added dropwise, with stirring, 400 grams (0.71 mole) of "Empol 1010" dimer acid. The mixture was heated under reflux for about 40 hours and then neutralized by the sequential addition of 96 ml. of water, 96 ml. of 15 percent aqueous sodium hydroxide solution, and 288 ml. of water. The neutralized mixture was filtered and the solvent was evaporated from the filtrate to yield the desired diol.

A solution of 200 grams (0.37 mole) of the diol, 157 ml. (2.24 moles) of acrylic acid, 3 grams of p-toluenesulfonic acid and 0.5 gram of p-methoxyphenol in 1000 ml. of toluene were heated under reflux as water was removed by azeotropic distillation. When the stoichiometric amount of water (about 13.3 ml.) had been removed, the solution was cooled, filtered and washed several times with dilute potassium carbonate solution and once with dilute sodium chloride solution. It was then dried over magnesium sulfate and the solvent was evaporated to afford the desired diacrylate as a liquid.

EXAMPLE 16

Following the procedure of Example 15, "Westvaco 1550 Diacid" was reduced by lithium aluminum hydride in tetrahydrofuran to a diol having formula VIII in which m is 5, p is 7 and the broken line indicates a double bond. This diol (85 grams, 0.25 mole) was reacted with acrylic acid (90 ml., 1.28 mole) in toluene solution to yield the desired diacrylate as a liquid.

EXAMPLE 17

Following a procedure similar to that of Example 13, a liquid diacrylate was prepared from a commercially available diol which was in turn prepared by hydrogenation of a methyl ester of linoleic acid dimer, and whose principal components have formulas VIII, IX and X wherein the broken lines represent predominantly single bonds.

EXAMPLE 18

A solution of 51 grams (0.20 mole) of 1,2-hexadecanediol, 100 ml. (1.5 moles) of acrylic acid, 1.5 grams of p-toluenesulfonic acid and 2 grams of p-methoxyphenol in 400 grams of toluene was heated for about 24 hours under reflux as water was removed by azeotropic distillation. The solution was cooled, filtered and washed several times with dilute potassium carbonate solution and once with dilute sodium chloride solution. It was then dried and the solvent was evaporated to afford the desired 1,2-hexadecanediol diacrylate as a liquid.

The polyfunctional acrylates may be polymerized under free-radical conditions, either alone or in the presence of other monomers. The term "polymer," as used herein, includes addition homopolymers and copolymers with one or more other monomers.

Polymerization by the free-radical method may be effected in bulk, solution, suspension or emulsion, by contacting the monomer or monomers with a polymerization initiator either in the absence or presence of a diluent at a temperature of about 0°–200° C. Suitable initiators include benzoyl peroxide, tertiary butyl hydroperoxide, acetyl peroxide, hydrogen peroxide, azobisisobutyronitrile, persulfate-bisulfite, persulfate-sodium formaldehyde sulfoxylate, chlorate-sulfite and the like. Alternatively, polymerization may be effected by irradiation techniques, as by ultraviolet, electron beam or plasma irradiation. The polymers thus obtained are generally crosslinked, as a result of the polyfunctionality of the acrylates.

Referring now to FIG. 1, there is shown in schematic form a capacitor comprising lower electrode 10 which may be aluminum foil, a dielectric coating 11 of a polyfunctional acrylate polymer which may be formed by deposition of one of the above-described acrylate compositions on the surface of electrode 10 by, for example, vacuum evaporation or roller coating and suitable polymerization, and upper electrode 12 which is a thin metallized layer of aluminum deposited on dielectric film 11. Leads 13 nd 14 are respectively attached to lower and upper electrodes 10 and 12.

Another aspect of the present invention is a method of making a capacitor, said method comprising the steps of forming on a substrate a dielectric coating of a polymer of at least one polyfunctional acrylate as previously described and depositing an electrode layer on said dielectric coating. The coating may be produced by applying the polymer, optionally in solution in a substantially inert solvent, by conventional means such as flowing, spraying, dipping, brushing, roller coating, spin coating, drawing down or the like, followed by evaporation of any solvent used. It is usually preferred, however, to apply a polyfunctional acrylate monomer film and subsequently polymerize it by one of the methods previously described. The use of electron beam polymerization is particularly preferred since such a process very rapidly polymerizes the monomer composition without the need for additional curing agents, and thus leads to economical production of very thin coatings.

Figure 4:
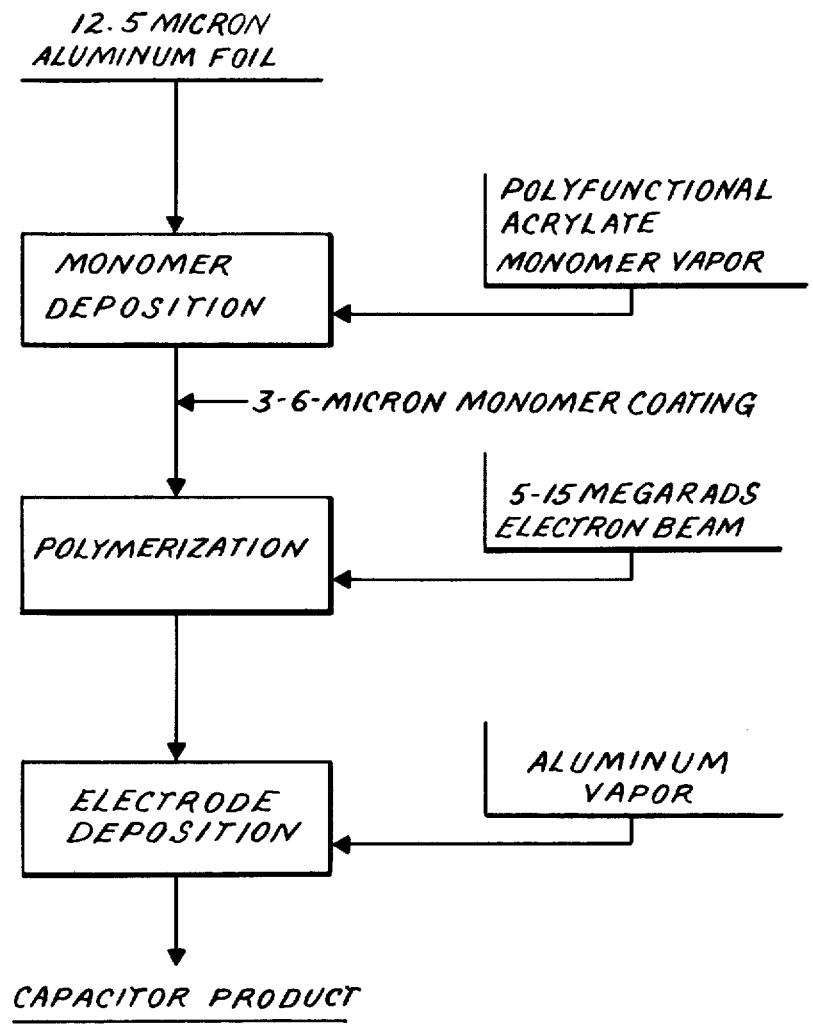

In one embodiment of the method of this invention, the substrate is itself a conductive material which may serve as an electrode, whereupon the two electrodes and the dielectric coating separating them may constitute the entire capacitor. FIG. 4 of the drawing is an illustrative flow diagram of this embodiment which is also illustrated by the following example.

EXAMPLE 19

Uniform prototype capacitors were produced by drawing down layers of the compositions of Examples 1–11 on an aluminum foil substrate, polymerizing said monomer layer by contact with an electron beam, and depositing a metallic aluminum layer thereon. The thickness of the aluminum foil electrode was 12.5 microns, that of the dielectric layer was 3–6 microns and that of the deposited aluminum electrode was 300–500 Angstroms (0.03–0.05 micron). The areas of the prototype capacitors were about 1 square inch. The dissipation factors of said capacitors were measured at 60 Hz. using an AC bridge.

Figure 2:
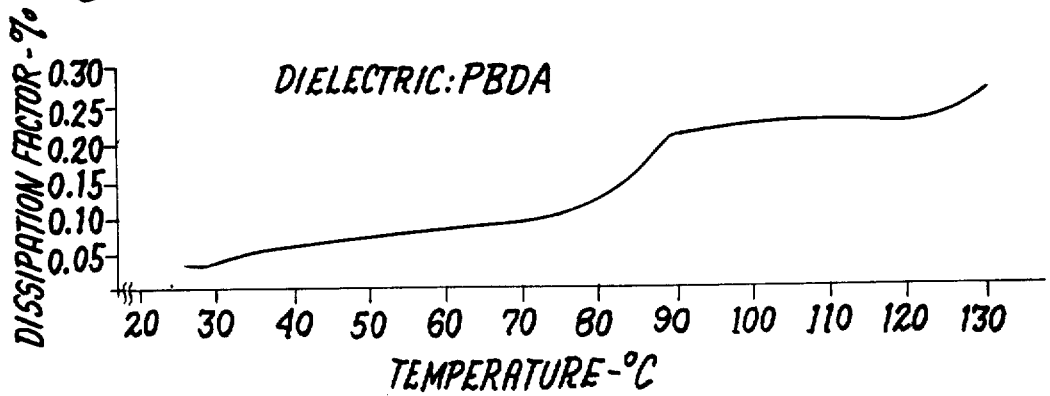
Figure 3:
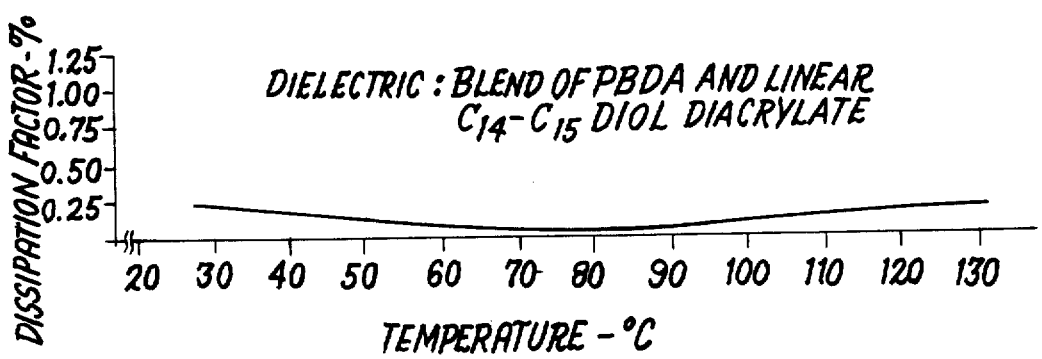

FIGS. 2 and 3 graphically depict the relationship between temperature and dissipation factor for typical prototype capacitors prepared as described above in which the polyfunctional acrylate compositions of Examples 1 and 2, respectively, were respectively polymerized by 15- and 10-megarad electron beams to form the dielectric coatings. As is apparent, the dissipation factors remained well below 0.3% from 30° to 130° C.

Table III lists the dissipation factors at various temperatures of other typical capacitors made as described above, using the previously described polyfunctional acrylate compositions.

TABLE III

| Example | Electron beam, megarads | Dissipation factor, % | | | | |
|---|---|---|---|---|---|---|
| | | 30° C. | 100° C. | 120° C. | 125° C. | 165° C. |
| 3 | 15 | 1.55 | — | 0.25 | — | — |
| 4 | 10 | 1.05 | — | 0.95 | — | — |
| 5 | 8 | — | 0.9 | — | — | — |
| 6 | 10 | 0.65 | — | 1.35 | — | — |
| 7 | 10 | 0.65 | — | 1.40 | — | — |
| 8 | 10 | 0.80 | — | 0.85 | — | — |
| 9 | 10 | 0.80 | — | 0.85 | — | 1.10 |
| 10 | 16 | 0.60 | — | 0.95 | — | — |
| 11 | 15 | 0.80 | — | — | 1.10 | — |

In another and preferred embodiment of the method of this invention, alternating electrode layers and dielectric coatings are deposited as described in the aforementioned application Ser. No. 620,647. The capacitors thus produced have particularly advantageous properties, such as high efficiency, capability of operation at high temperatures, long term electronic stability, favorable failure mode and versatility over a wide range of capacitances. The following examples illustrate some of the advantageous properties of such capacitors.

EXAMPLE 20

The procedure described in the aforementioned application Ser. No. 620,647 was used to prepare a capacitor about 18 mm. in width. The substrate was aluminum foil about 50 microns thick. Alternate dielectric (thickness about 1 micron) and electrode (thickness about 200-500 Angstroms) layers were deposited. The dielectric layers were formed by evaporation of the product of Example 12 at 375° C. and deposition on an electrode surface maintained at 24° C., followed by electron beam-initiated polymerization, and the electrode layers by vapor deposition of aluminum. The finished capacitor contained 1000 layers each of dielectric and deposited electrode. The dissipation factor thereof, measured at 60 Hz. over a 30°-150° C. temperature range, varied from a maximum of 3.10% at 30° C. to a minimum of 0.300% at 150° C.

EXAMPLE 21

A capacitor was prepared as described in Example 20, except that dielectric was a polymer of the product of Example 17, said product was deposited by evaporation at 400° C. and deposition at 48° C., the thickness of the electrode layers was 300-500 Angstroms and the capacitor contained 200 layers each of dielectric and deposited electrode. The dissipation factor thereof, measured at 100 Hz. over a 30°-130° C. temperature range, varied from a maximum of 2.8% at 30° C. to a minimum of 0.7% at 90°-130° C.

EXAMPLE 22

A number of capacitors, prepared as in Example 20 except for numbers of layers and dielectric layer thickness in some cases, were cut to various sizes to provide specific capacitance values and tested for extended periods under the AC voltage and temperature conditions listed in Table II. None of said capacitors had failed at the ends of the test periods listed.

TABLE IV

| Layers | Dielectric thickness, microns | Capacitance, microfarads | Voltage | Temp. °C. | Hours |
|---|---|---|---|---|---|
| 1000 | 1.2 | 0.2 | 20 | 130 | 500 |
| 100 | 1.1 | 0.19 | 50 | 85 | 664 |
| 930 | 1.1 | 0.19 | 25 | 85 | 68 |
|  |  |  | 50 | 85 | 609 |
| 500 | 1 | 2 | 20 | 130 | 1123 |
| 500 | 1 | 0.11 | 25 | 85 | 68 |
|  |  |  | 50 | 85 | 776 |
| 500 | 1.1 | 0.1 | 25 | 85 | 68 |
|  |  |  | 50 | 85 | 776 |

These results show the stability of capacitors of this type over prolonged operation periods at relatively high temperature.

In addition to the capacitor structures previously disclosed herein, the present invention is applicable to wound roll and other known types of capacitors. The dielectric coating in suitable cases may be a self-supporting film, instead of being adherently deposited on the electrode substrate.

What is claimed is:

1. A capacitor comprising two electrodes separated by a dielectric member, said dielectric member comprising a polymer of at least one polyfunctional acrylate having the formula

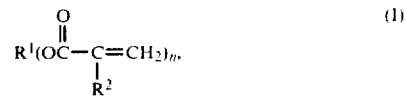

wherein:
   $R^1$ is a hydrocarbon or substituted hydrocarbon radical containing at least 4 carbon atoms;
   $R^2$ is hydrogen or an alkyl radical containing 1-5 carbon atoms; and
   n is from 2 to 6.

2. A capacitor according to claim 1 wherein the electrodes are aluminum.

3. A capacitor according to claim 2 wherein $R^2$ is hydrogen or methyl and n is 2 or 3.

4. A capacitor according to claim 3 wherein the polyfunctional acrylate is derived from an aliphatic polyhydroxy compound containing about 4-20 carbon atoms, a polymer having groups capable of reacting with acrylic acid or derivatives thereof and having a number average molecular weight within the range of about 1000-5000, or an aromatic diepoxide or polyepoxide.

5. A capacitor according to claim 4 wherein the polyfunctional acrylate is selected from the group consisting of trimethylolpropane triacrylate, neopentyl glycol diacrylate, bisphenol A diacrylate, diacrylates of diepoxides derived from bisphenol A and ethoxylated derivatives thereof, diacrylates of α,ω-alkanediols containing an average of 12-20 carbon atoms and diacrylates of butadiene resins having a number average molecular weight of about 3000.

6. A capacitor according to claim 5 wherein $R^2$ is hydrogen.

7. A capacitor according to claim 5 wherein the polymer is prepared from a blend of polyfunctional acrylates.

8. A capacitor according to claim 7 wherein $R^2$ is hydrogen.

9. A capacitor according to claim 4 wherein the polymer is a copolymer prepared from a mixture of at least one compound of formula I with at least one monoacrylate of the formula

wherein $R^3$ is a hydrocarbon or substituted hydrocarbon radical containing about 4-25 carbon atoms.

10. A capacitor according to claim 9 wherein the monoacrylate is cyclohexyl methacrylate.

11. A method of making a capacitor which comprises the steps of forming on a substrate a dielectric coating of a polymer of at least one polyfunctional acrylate having the formula

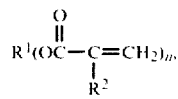

wherein:
- $R^1$ is a hydrocarbon or substituted hydrocarbon radical containing at least four carbon atoms;
- $R^2$ is hydrogen or an alkyl radical containing 1–5 carbon atoms; and
- n is from 2 to 6;

and depositing an electrode layer on said dielectric coating.

12. A method according to claim 11 wherein the dielectric coating is formed by applying a polyfunctional acrylate monomer film and subsequently polymerizing said film.

13. A method according to claim 12 wherein $R^2$ is hydrogen or methyl and n is 2 or 3.

14. A method according to claim 13 wherein the polyfunctional acrylate is derived from an aliphatic polyhydroxy compound containing about 4–20 carbon atoms, a polymer having groups capable of reacting with acrylic acid or derivatives thereof and having a number average molecular weight within the range of about 1000–5000, or an aromatic diepoxide or polyepoxide.

15. A method according to claim 14 wherein the monomer film is polymerized by an electron beam.

16. A method according to claim 14 wherein $R^2$ is hydrogen.

17. A method according to claim 16 wherein the polymer is prepared from a blend of polyfunctional acrylates.

18. A method according to claim 17 wherein $R^2$ is hydrogen.

19. A method according to claim 14 wherein the polymer is a copolymer prepared from a mixture of at least one compound of formula I with at least one monoacrylate of the formula

wherein $R^3$ is a hydrocarbon or substituted hydrocarbon radical containing about 4–25 carbon atoms.

20. A method according to claim 19 wherein the monomer film is polymerized by an electron beam.

* * * * *